United States Patent [19]
Martin

[11] Patent Number: 5,738,299
[45] Date of Patent: Apr. 14, 1998

[54] VISUAL INDICATOR MEANS FOR WARNING A PILOT OF AN ENGINE COMPARTMENT FIRE

[76] Inventor: Michael C. Martin, 5527 Stonecliffe Dr., Lincoln, Nebr. 68516

[21] Appl. No.: 280,950

[22] Filed: Jul. 27, 1994

[51] Int. Cl.⁶ ................................ B64D 47/02
[52] U.S. Cl. ............ 244/1 R; 244/129.2; 116/202; 340/578
[58] Field of Search ............... 244/1 R, 129.1, 244/129.2; 359/838, 503, 504; 340/578; 116/202, 28 R

[56] References Cited

U.S. PATENT DOCUMENTS

| | | | |
|---|---|---|---|
| 1,285,650 | 11/1918 | Du Pont | 359/838 |
| 1,462,065 | 7/1923 | Lee | 116/202 |
| 2,692,982 | 10/1954 | Metcalf | 340/578 |
| 2,873,714 | 2/1959 | Bauerlein | 116/202 |
| 2,921,552 | 1/1960 | Miller | 116/202 |
| 3,536,029 | 10/1970 | Kuwayama et al. | 116/202 |
| 3,678,741 | 7/1972 | Burley | 116/28 R |
| 4,701,624 | 10/1987 | Kern et al. | 340/578 |
| 4,964,711 | 10/1990 | Degnan | 244/1 R |
| 5,191,412 | 3/1993 | Thompson | 244/129.2 |

FOREIGN PATENT DOCUMENTS

| | | | |
|---|---|---|---|
| 133839 | 10/1948 | Sweden | 244/129.2 |

OTHER PUBLICATIONS

Aviation Safety, Fire Under the Cowling by Bill Kelly, May 1, 1994 pp. 1–5.

*Primary Examiner*—Galen L. Barefoot
*Attorney, Agent, or Firm*—Zarley, McKee, Thomte, Voorhees & Sease; Dennis L. Thomte

[57] ABSTRACT

A visual indicator is provided for warning a pilot of an engine compartment fire and comprises a housing which is mounted on the cowling enclosing the engine compartment. In one form of the invention, a lens and mirror arrangement is provided for transmitting light through the housing so that the pilot will be warned of the existence of an engine compartment fire.

8 Claims, 1 Drawing Sheet

VISUAL INDICATOR MEANS FOR WARNING A PILOT OF AN ENGINE COMPARTMENT FIRE

FIELD OF THE INVENTION

Engine compartment fires in private aircraft are seldom experienced. However, when a fire does occur within the engine compartment while the aircraft is in flight, disastrous results frequently occur.

In single-engine airplanes, the engine compartment is located in front of the pilot and is enclosed by a cowling or cowl. In multi-engine airplanes, the engine compartments are usually located on either side of the cockpit and are also enclosed by cowlings or cowls. Since the cowling encloses the engine compartment, the pilot is not able to visually ascertain conditions which exist within the engine compartment such as a fire or the like. Normally, the pilot does not become aware of the fire until the fire has progressed beyond a disastrous point.

Although many modern airplanes have sensors for indicating engine compartment fires, those sensors sometimes do not properly function. Further, the sensors are fairly expensive and are not apparently included on all modern aircraft.

SUMMARY OF THE INVENTION

A visual indicator is mounted on the cowling of the airplane which encloses the engine compartment. The indicator includes a housing having an inner end which is in communication with the interior of the engine compartment and an outer end which is visible to the pilot whether the cowling is located in front of the pilot or to the side of the pilot. A light transmission means is provided in the housing to transmit the light produced by an engine compartment fire through the housing so that the pilot will be warned of the engine compartment fire. In one embodiment, an optically ground lens is positioned in the housing. The optically ground lens may have optional magnification means associated therewith. In another embodiment, fiber optic cables are positioned in the housing for transmitting the light created by an engine compartment fire so as to be visible by the pilot. In yet another embodiment, a mirror arrangement is mounted in the housing for transmitting the light. In yet another embodiment, a light reflective coating is provided in the housing.

It is therefore a principal object of the invention to provide a visual indicator means for warning a pilot of an engine compartment fire.

A further object of the invention is to provide a visual indicator means which is mounted on the engine cowling and which is adapted to transmit light, created by an engine compartment fire, therethrough so that the light will be visible to the pilot thereby warning the pilot of an engine compartment fire.

Yet another object of the invention is to provide a visual indicator means as described including light transmission means therein.

Yet another object of the invention is to provide a visual indicator means for warning a pilot of an engine compartment fire and which may be mounted on existing aircraft with a minimum of expense and with a minimum of modification thereto.

These and other objects will be apparent to those skilled in the art.

DESCRIPTION OF THE PREFERRED EMBODIMENT

Figure 1:
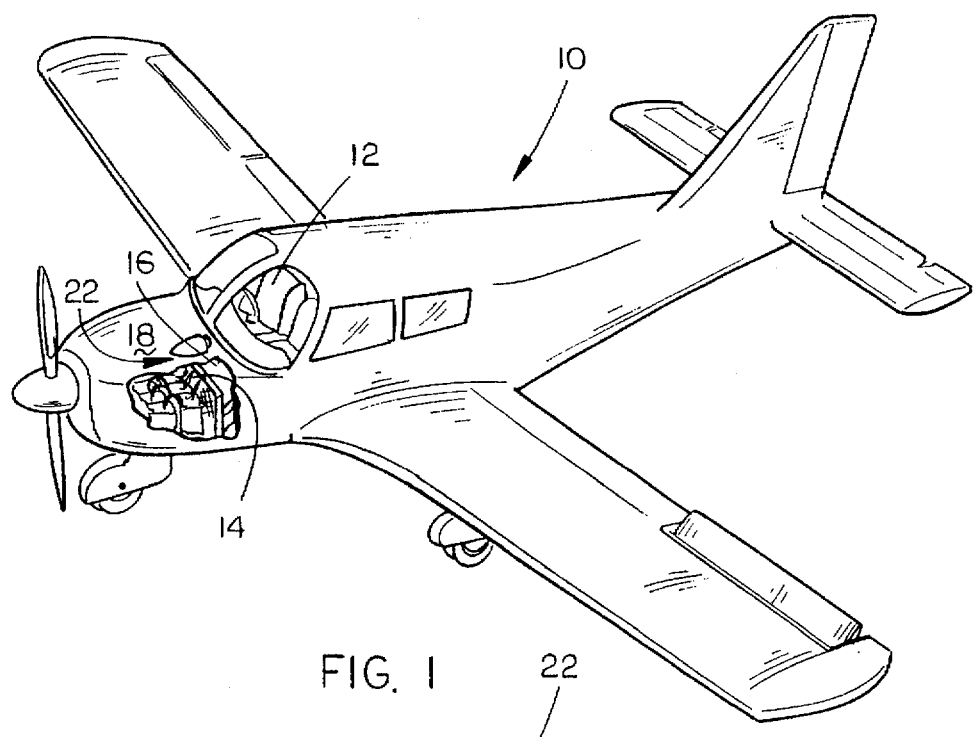
FIG. 1 is a front prospective view of a single-engine aircraft with portions of the engine cowling cut away to illustrate the engine therein.
Figure 2:
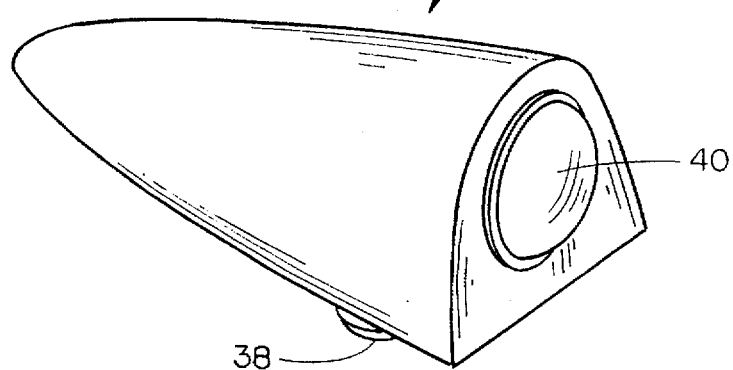
FIG. 2 is a prospective view of the visual indicator means of this invention.

The numeral 10 refers to a single-engine aircraft including a cockpit 12, engine 14 located within engine compartment 16, and a cowling 18 which removably closes the engine compartment 16.

The visual indicator means of this invention is referred to generally by the reference numeral 10 and includes a housing 22 which may be constructed of metal or fiberglass if so desired. Housing 22 is secured to the cowling 18 by any conventional means such as by studs 24 and 26 extending therefrom through the cowling 18 and being held in place by the nuts 28 and 30, respectively.

Figure 3:
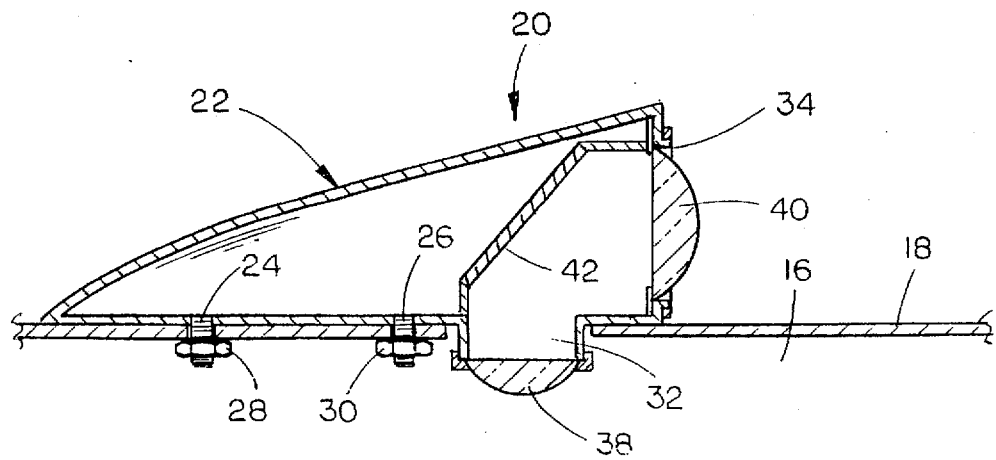
FIG. 3 is a longitudinal sectional view of the visual indicator means of FIG. 2.

Housing 22 includes an inner end 32 which is in communication with the engine compartment 16 as illustrated in FIG. 3. Housing 22 also includes an outer end 34 which is positioned so as to be directed towards the cockpit 12.

A light transmission means 36 is provided in the housing 22 between the inner and outer ends thereof so as to transmit light, which is created by an engine compartment fire, so that the light thereof will be visible to the pilot in the cockpit 12 to warn the pilot that an engine compartment fire is in progress. The light transmission means 36 may take many forms. In FIG. 3, an optically ground lens 38 is provided at the inner end of the housing 22 and an optically ground lens 40 is provided at outer end of the housing 22. A reflective mirror assembly 42 is provided in the housing 22 as illustrated in FIG. 3 so that light passing through the lens 38 will be reflected into the lens 40.

If desired, the light transmission means 36 could be comprised of a single lens. If desired, the single lens or the lenses 38 and 40 could be provided with magnification. A further type of lights transmission means is to simply provide a light reflective coating between the inner and outer ends of the light transmission means. A further type of light transmission means is a bundle of fiber optic cables which would extend from the inner end to the outer ends of the light transmission means. Yet another type of light transmission means would be a mirror assembly which would reflect the light through the housing so as to be visible by the pilot.

Thus it can be seen that a novel visual indicator means has been provided which will warn a pilot of an engine compartment fire. The visual indicator means of this invention may be installed on existing aircraft with a minimum of expense and with a minimum modification of the aircraft.

Thus it can be seen that the invention accomplishes at least all of its stated objectives.

I claim:

1. In combination:

an airplane having an engine cowling;

said cowling having a top portion which is visible to the pilot of the airplane;

a light transmission means having an inner end in communication with the interior of said cowling and an outer end positioned on said top portion of said cowling which is visible to the pilot of the airplane so that if a fire should occur within the engine cowling, the light from the fire within the cowling will be visible to the pilot.

2. The combination of claim 1 wherein said light transmission means comprises a mirror assembly.

3. The combination of claim 1 wherein said light transmission means comprises a fiber optic cable means.

4. The combination of claim 1 wherein said light transmission means comprises a light reflective coating.

5. The combination of claim 1 wherein said light transmission means comprises a mirror and lens assembly.

6. The combination of claim 1 wherein said light transmission means includes a magnification means.

7. The combination of claim 1 wherein said light transmission means comprises an optically ground lens assembly.

8. The combination of claim 7 wherein said optically ground lens assembly includes magnification means.

* * * * *